(12) United States Patent
Bolshtyansky (10) Patent No.: US 6,710,916 B1
(45) Date of Patent: Mar. 23, 2004

(54) GRATING-BASED DISPERSION COMPENSATION DEVICES

(75) Inventor: Maxim A. Bolshtyansky, Bound Book, NJ (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 10/225,338

(22) Filed: Aug. 19, 2002

Related U.S. Application Data (60) Provisional application No. 60/314,201, filed on Aug. 23, 2001.

(51) Int. Cl.[7] ............................ H01S 3/00; H04J 14/02
(52) U.S. Cl. ........................ 359/337.5; 398/81
(58) Field of Search ..................... 359/337.5, 334; 398/81

(56) References Cited

U.S. PATENT DOCUMENTS 6,421,167 B1 * 7/2002 Cohen et al. ................ 359/337
6,453,093 B2 * 9/2002 Xie et al. ..................... 385/37

FOREIGN PATENT DOCUMENTS

JP 02002048927 A * 2/2002
WO WO 02/054631 A2 * 7/2002

* cited by examiner

Primary Examiner—Mark Hellner
(74) Attorney, Agent, or Firm—G. Victor Treyz (57) ABSTRACT

Fiber-based dispersion compensation elements are provided for use in optical amplifiers and other optical network equipment that handle optical data signals in fiber-optic communications links. The dispersion compensation elements may include chirped superstructure fiber gratings. Systems and method for fabricating the dispersion compensation elements using ultraviolet light are provided.

15 Claims, 8 Drawing Sheets

GRATING-BASED DISPERSION COMPENSATION DEVICES

This application claims the benefit of provisional patent application No. 60/314,201, filed Aug. 23, 2001.

BACKGROUND OF THE INVENTION

The present invention relates to fiber-optic communications networks, and more particularly, to grating-based dispersion compensators for optical network equipment.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

Dispersion compensation elements are used in fiber-optic links to compensate for the effects of chromatic dispersion. One popular type of dispersion compensation element is based on dispersion-compensating fiber. A coil of about 10–15 km of dispersion-compensating fiber may be installed as a module in the midstage of an optical amplifier to compensate for the accumulated chromatic dispersion on a preceding span of optical transmission fiber in a communications link. Dispersion compensation modules and optical amplifiers that include dispersion-compensating fiber may, however, be bulky.

It is an object of the present invention to provide improved dispersion compensation elements for use in optical network equipment such as optical amplifiers.

It is another object of the present invention to provide grating-based dispersion compensation elements.

SUMMARY OF THE INVENTION

These and other objects of the invention are accomplished in accordance with the present invention by providing optical amplifiers and other optical network equipment in which dispersion compensation elements based on fiber gratings may be used. The dispersion compensation elements may be provided in the form of dispersion compensation modules that may be installed, for example, at midstage access ports in optical amplifiers.

The fiber gratings may be based on a chirped superstructure configuration that allows the dispersion compensation devices to cover a wide signal bandwidth with good performance. The superstructure grating configuration includes a number of grating portions or samples that are organized to form a larger grating pattern.

In order for each grating to provide dispersion compensation that covers a sufficiently wide bandwidth and a sufficiently wide channel size, the gratings may be chirped in two respects. First, a relatively small amount of chirp may be impressed linearly along the length of the entire grating across all of the samples in the superstructure. This chirp contribution ensures that wavelength-division-multiplexing communications channels of normal bandwidths (e.g., 25–100 GHz) may be adequately covered. Second, a relatively large amount of chirp may be impressed across each grating sample. This chirp contribution helps to ensure that the total bandwidth covered by the grating is sufficiently wide (e.g., 30–40 nm). The total bandwidth may cover the entire C-band or L-band or other suitable signal band in an optical amplifier and communications link.

The gratings may be fabricated using by using an excimer laser or other suitable ultraviolet (UV) light source to impress grating patterns on a photosensitive fiber through a mask. The mask may include the relatively small chirp contribution. A lens arrangement may be used that relies on cylindrical lens aberrations to help create the desired relatively large chirp contribution.

Further features of the invention and its nature and various advantages will be more apparent from the accompanying drawings and the following detailed description of the preferred embodiments.

DETAILED DESCRIPTION OF THE PREFERRED EMBODIMENTS

Optical amplifiers and other optical network equipment may be used in fiber-optic communications networks. A typical optical amplifier may be used to amplify optical data signals as they travel along transmission fiber spans in a fiber-optic communications link. The optical data signals may correspond to a number of wavelength-divisionmultiplexing channels at different wavelengths. In a typical arrangement, there may be about 40 channels spaced 100 GHz apart across the signal band. Amplifiers may amplify the optical data signals to overcome the attenuation associated with the fiber spans.

Amplifiers may be based on optically-pumped rare-earth-doped fiber coils. For example, amplifiers may be based on optically-pumped erbium-doped fiber coils that provide amplification over the C-band (1520–1575 nm) or the L-band (1570–1605 nm) wavelength regions. Optical network equipment may also be used to perform other functions, such as channel add/drop functions, optical switching, optical regeneration, monitoring, etc.

For clarity, the present invention will be described primarily in connection with optical amplifiers. This is, however, merely illustrative. The dispersion compensation elements of the present invention may be used in any suitable optical network equipment or arrangement.

As optical data signals travel along a fiber-optic communications link, they are subject to the effects of chromatic dispersion. Dispersion compensation elements may be provided at various nodes in the link to compensate for the effects of dispersion. The dispersion compensation elements may sometimes be installed in optical amplifier midstage locations, because this arrangement helps to reduce the performance penalties that are associated with introducing lossy dispersion compensation elements into the signal path. Because not all fiber spans are the same length, each fiber span may produce a different amount of dispersion. Accordingly, dispersion compensation elements may be provided in the form of dispersion compensation modules of different strengths that are installed as needed in different network locations.

Figure 1:
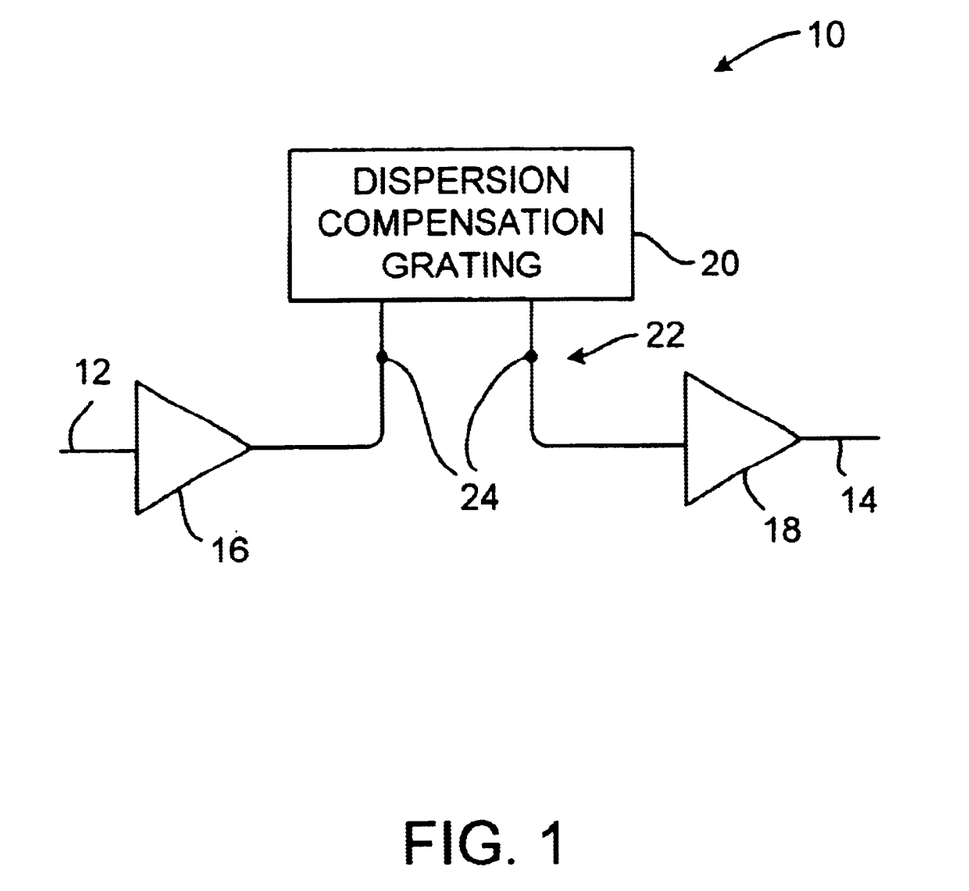
FIG. 1 is a schematic diagram of an illustrative optical amplifier with a grating-based dispersion compensation module in accordance with the present invention.

An illustrative optical amplifier 10 is shown in FIG. 1. Optical data signals to be amplified may be provided to input fiber 12. Input fiber 12 may, for example, receive input signals from a span of transmission fiber in a fiber-optic communications link. Corresponding amplified output data signals may be provided at output fiber 14. Fiber 14 may, for example, be used to direct the amplified output optical data signals back into the fiber-optic link.

Optical gain may be provided by one or more gain stages such as gain stages 16 and 18. Gain stages 16 and 18 may be based on optically-pumped rare-earth-doped fiber such as erbium-doped fiber, Raman-pumped fiber, semiconductor optical amplifier devices, or any other suitable gain media. Amplifier 10 may have one gain stage, two gain stages, three gain stages, or more than three gain stages.

Amplifier 10 may have one or more midstage access ports (e.g., an access port located between gain stages) such as port 22. A module such as a dispersion-compensation module 20 or other suitable module may be installed in amplifier 18 using port 22. Port 22 may use connectors 24 (e.g., reusable connectors) or fiber splices or other suitable connections to connect modules such as module 20 into amplifier 10.

Dispersion-compensation module 20 may be based on a fiber Bragg grating and may, if desired, include other dispersion compensation elements such as dispersion-compensating fiber, etc. The arrangement of FIG. 1 is merely illustrative. If desired, a dispersion compensator based on a grating may be installed in an amplifier 10 without using a midstage access port arrangement of the type shown in FIG. 1.

Figure 2:
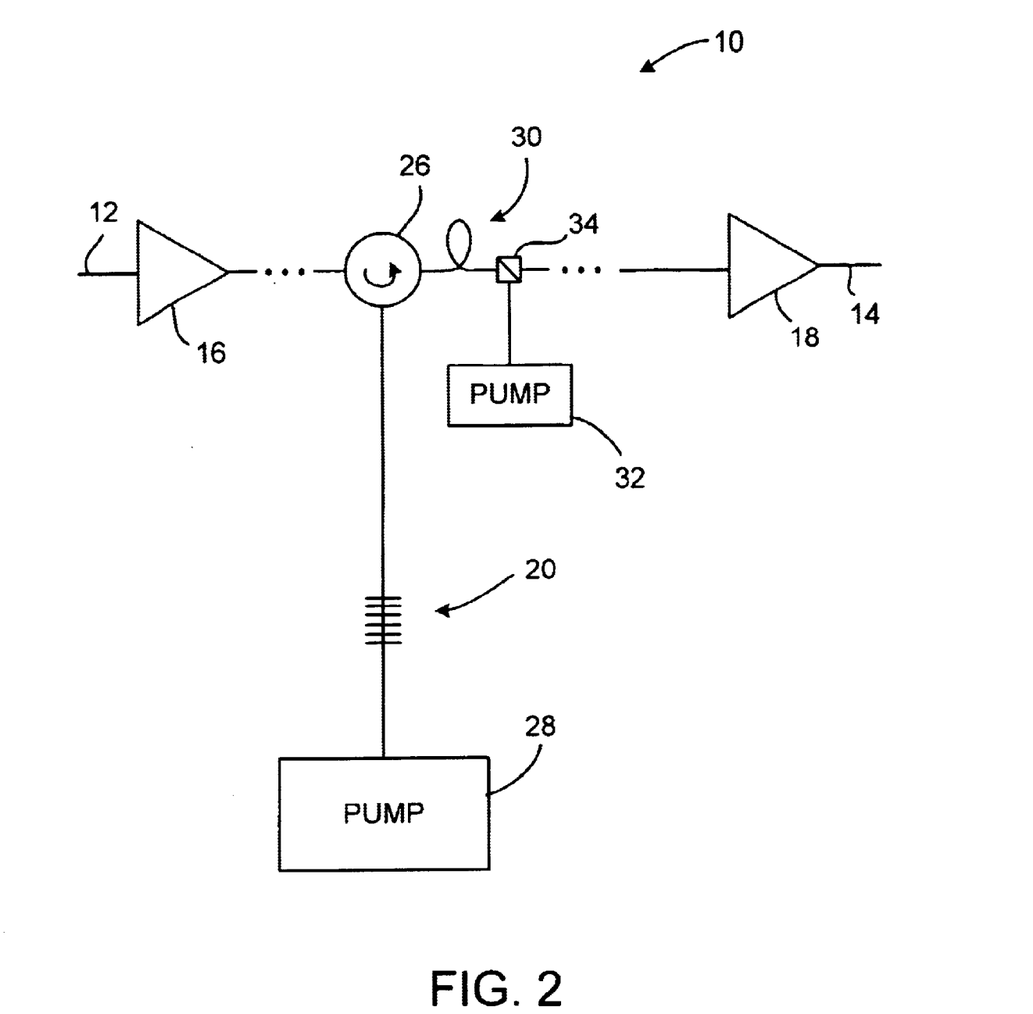
FIG. 2 is a schematic diagram of an illustrative optical amplifier having a grating-based dispersion-compensating element that,may serve as a pump coupler in accordance with the present invention.

As shown in FIG. 2, dispersion compensation grating 20 may be used as a pump coupler. Optical gain may be provided by optically pumping fiber coil 30 with pump light from pump 28. Fiber coil 30 may be a rare-earth-doped fiber such as erbium-doped fiber or may be a small-core-area fiber such as dispersion-compensating fiber or other suitable fiber that is Raman pumped with pump light that is a Stokes shift in wavelength (13 THz in frequency) below the signal band being handled by amplifier 10. Pump light from pump 28 (e.g., 980 nm or 1480 nm light when pump 28 is a diode laser used to pump erbium-doped fiber 30) may pass through the grating 20 and may be directed into fiber 30 by circulator 26. Optical data signals from input 12 may also be directed through coil 30 by circulator 26 after the optical data signals have reflected from grating 20 for dispersion compensation.

Coil 30 may be pumped using additional pumps. For example, coil 30 may be pumped by pump 32. Pump light from pump 32 may be coupled into coil 30 using pump coupler 34. Pump coupler 34 may be a wavelength-division-multiplexing coupler or other suitable pump coupler. Light from input 12 travels through gain stage 16 and circulator 26, reflects off of grating 20, is amplified by the gain in coil 30 and gain stage 18 and is passed to output 14. If desired, other gain stages and components may be used in amplifier 10, but these stages and components are not included in the example of FIG. 2 to avoid over-complicating the drawing.

Figure 3:
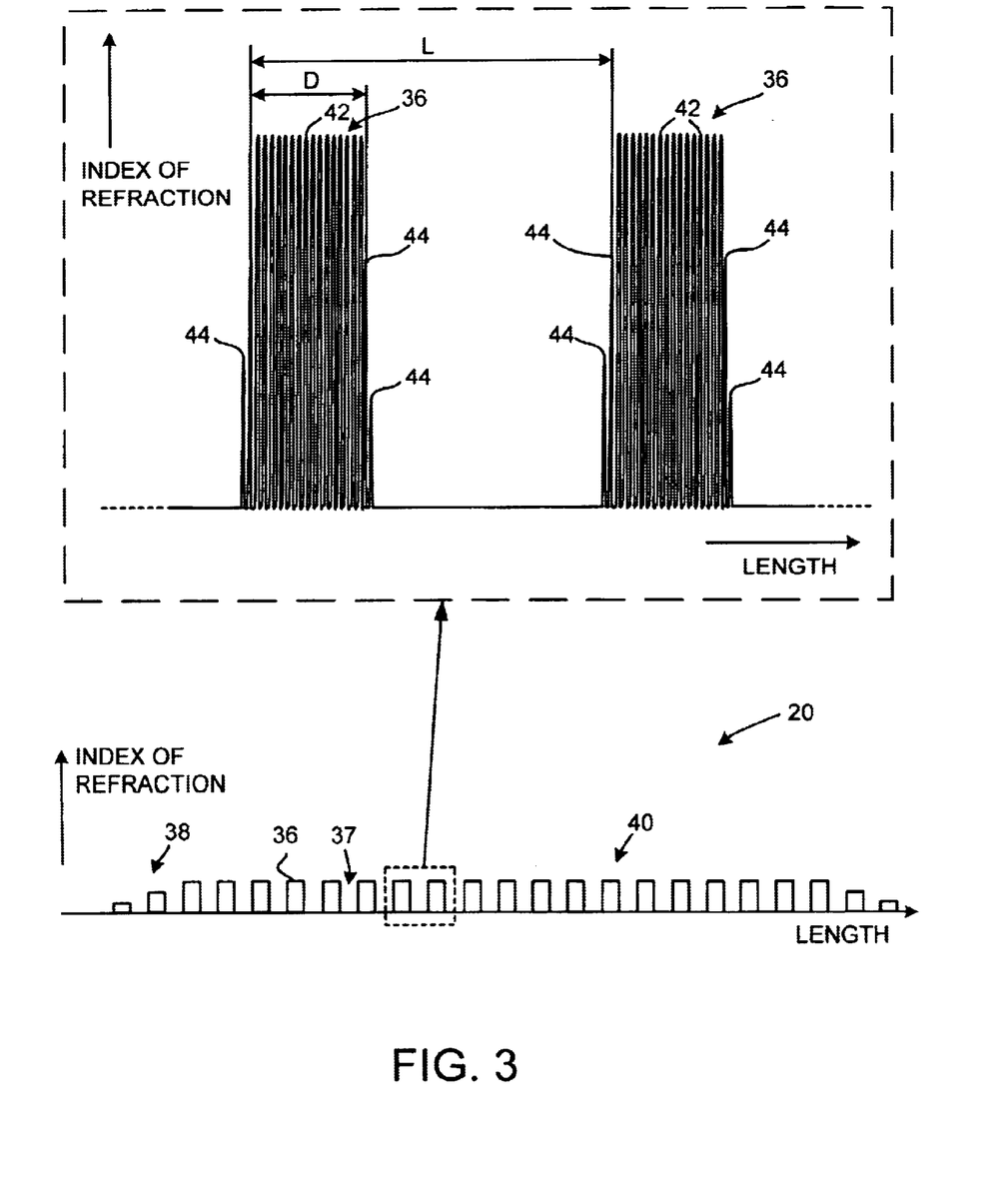
FIG. 3 includes a schematic diagram of an illustrative superstructure grating and a corresponding graph showing the index of refraction profile of an illustrative section of the grating in accordance with the present invention.

Grating 20 may be a chirped superstructure grating. An illustrative superstructure grating is shown in FIG. 3. As shown in the lower portion of FIG. 3, a superstructure grating may be characterized by a plurality of grating portions or samples 36 that are separated by empty portions 37 in which no pattern has been created in the fiber. As shown by the inset in FIG. 3, the gratings samples 36 may be characterized by a length d and may be separated by a distance l.

In order to create an even reflectivity versus wavelength characteristic within each channel of the dispersion compensator formed by grating 20, the superstructure may be apodized. With this arrangement, the depth or strength of the grating samples (i.e., the amount of index of refraction change in the grating samples) may be smoothly reduced at the ends 38 of the superstructure relative to the middle 40 of the superstructure. Moreover, as shown in the inset of FIG. 3, the index of refraction changes that make up each period of the grating samples 36 may themselves be apodized, as shown by the reduced height of grating periods 44 at the ends of samples 36 relative to the nominal height of grating periods 42 in the middle of grating samples 36. Apodizing the grating samples helps to create a reflectivity versus wavelength characteristic that is smooth across the entire signal band that is being dispersion compensated by grating 20. Apodization of each grating sample 36 may occur naturally due to the diffraction of the light which is used for grating recording. An amplitude mask may be used to produce global apodization of superstructure grating 20. Global apodization may also be produced by varying the writing times and intensities during grating fabrication.

The spacing of each period in grating samples 36 may be about 0.5 $\mu$m. The lengths d and l may be about 0.5 mm. The total length of grating 20 may be about 10 cm. These are merely illustrative lengths. Any suitable lengths may be used if desired, depending on the desired signal bandwidth to be covered and desired dispersion characteristics of grating 20.

Figure 4:
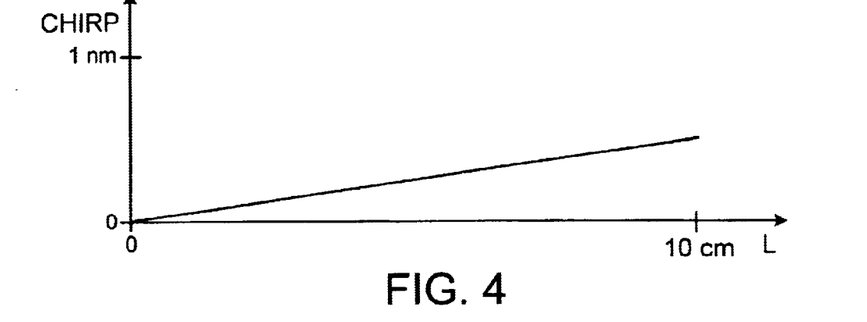
FIG. 4 is a graph showing one of the illustrative chirp contributions that may be used when forming the grating in accordance with the present invention.
Figure 5:
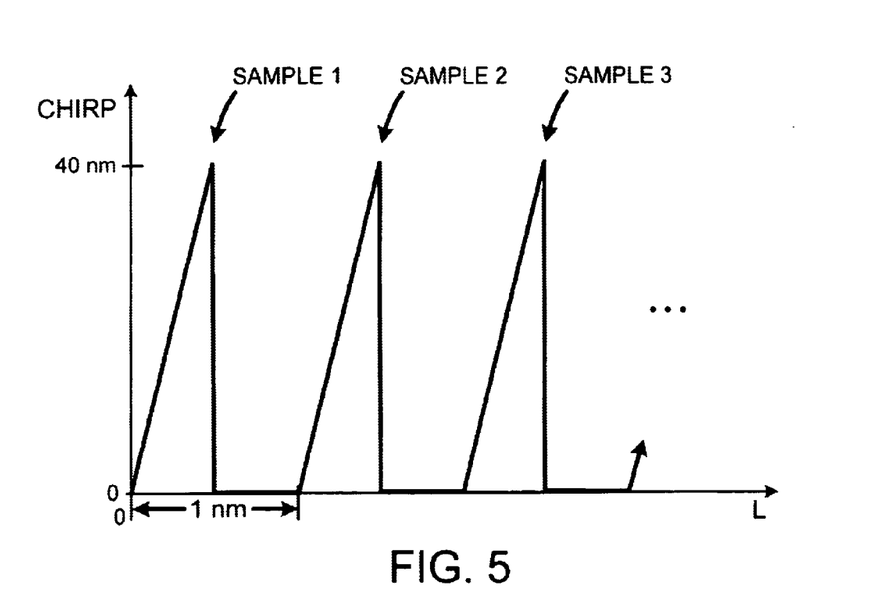
FIG. 5 is a graph showing another one of the illustrative chirp contributions that may be used when forming the grating in accordance with the present invention.

The grating 20 may be formed by sinusoidally modifying the index of refraction of a fiber along its length. The grating may be chirped in two respects. First, a relatively small linear chirp of about 0–1 nm may be impressed on the grating periods over the entire length of grating 20, as shown in FIG. 4. Second, a relatively larger chirp of about 0–40 nm may be impressed on each sample. If there is a sample, for example, every 1 mm along the fiber, there will be a 0–40 nm chirp for each 1 mm along the length of the fiber, as shown by the pattern of FIG. 5. The chirp contributions of FIGS. 4 and 5 may both be present simultaneously in the grating 20.

Figure 6:
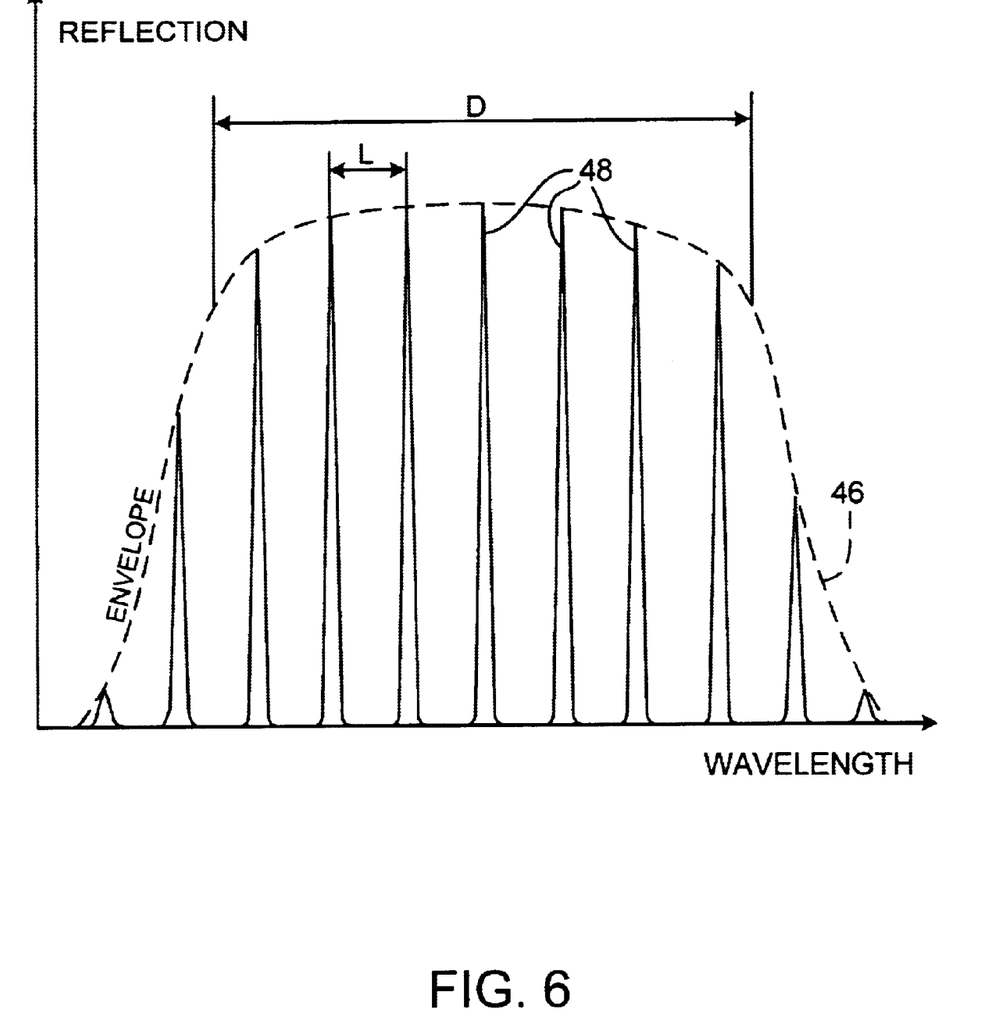
FIG. 6 is a graph of a reflection characteristic for an illustrative superstructure grating.

The reflection versus wavelength characteristic of a single grating sample 36 is represented by dashed line 46 in FIG. 6. If we look at the reflection of the multiple samples 36, interference effects will transform the reflection spectrum of the single sample 36 into a "spiky" structure of the type shown schematically by solid curve 48. The parameters L and D of FIG. 6 are inversely proportional to the parameters l and d of FIG. 3.

The example of FIG. 6 corresponds to an idealized case in which there is no chirp in the grating. In the actual filter grating, the chirp of FIG. 4 ensures that the "spike width" or channel width is sufficiently wide to cover a normal (e.g., 50 GHz-wide) wavelength-division-multiplexing communications channel. The chirp of FIG. 5 ensures that the bandwidth of the reflection spectrum (e.g., the bandwidth D in FIG. 6) is sufficient to cover an adequate signal band (e.g., 30–40 nm or the entire C-band or entire L-band) and reduces the refractive index change required to create sufficient reflection from grating 20, so that samples 36 may be shorter in length and the process of fabricating the gratings may be made easier.

Figure 7:
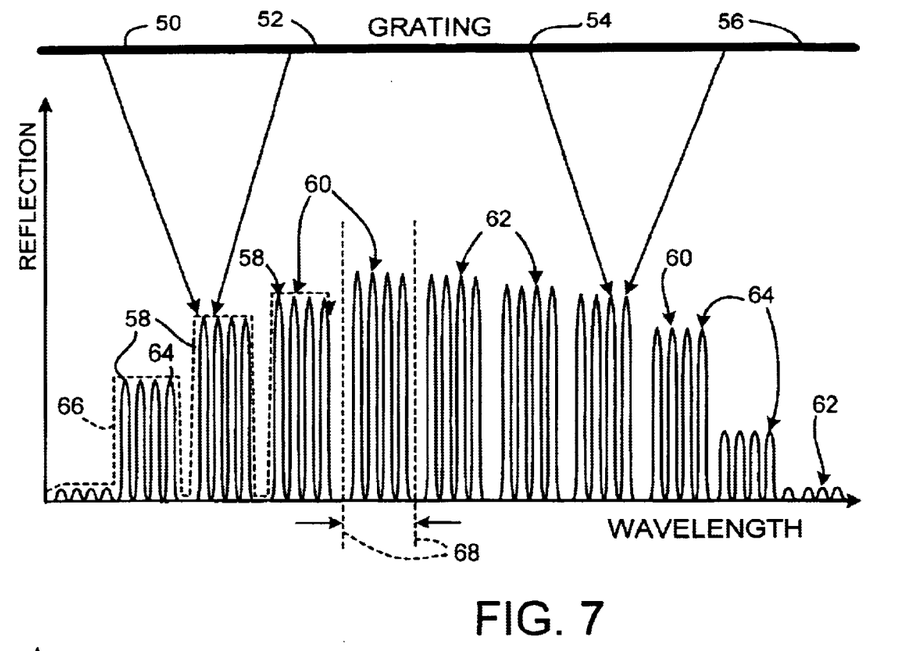
FIG. 7 is a graph of an illustrative superstructure grating formed using the illustrative chirp contributions of FIGS. 4 and 5 and a fixed grating sample spacing in accordance with the present invention.

FIG. 7 shows the spectrum of the whole grating 20 decomposed into reflection spectrums of different illustrative groups of samples 36 with the same characteristics (as an example). Because of the chirp of FIG. 4, the different portions 50, 52, 54, and 56 of the fiber on which grating 20 is formed have corresponding reflection spectra 58, 60, 62, and 64 that are shifted with respect to each other.

In an actual grating 20, not only groups of samples 36, but each grating sample 36 itself may reflect a slightly shifted spectrum, which creates the periodic structure shown by dashed line 66 (shown only partly in FIG. 7 to avoid over-complicating the drawing). Spectrum 66 is produced because the different optical signals within each wavelength-division-multiplexing channel on the communications link (one of which is represented by the wavelength band between dashed lines 68) will be reflected from different samples 36 of the fiber grating 20. The optical path of the optical signals will increase (or decrease, depending on the sign of the grating chirp) with wavelength within each single channel. The situation is the same for each channel—i.e., the optical path smoothly changes with wavelength within the channel. The change of optical path length is periodic, so the dispersion experienced within each channel (in this example) is the same.

Figure 8:
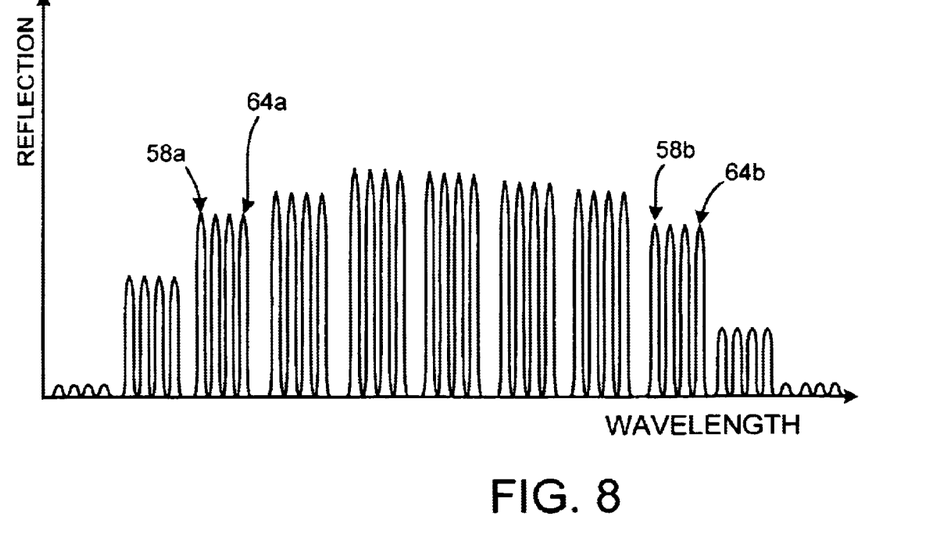
FIG. 8 is a graph of an illustrative superstructure grating formed using the illustrative chirp contributions of FIGS. 4 and 5 and a varying grating sample spacing that is suitable for compensating for dispersion slope in accordance with the present invention.

If compensation of dispersion slope is necessary, then the superstructure modulation length l (the spacing between adjacent grating samples) can be chirped as well, i.e., l may be varied as a function of length. This results in different L parameters for different sections of the fiber. The combined spectra for an illustrative grating of this type are shown in FIG. 8. As shown in FIG. 8, the rate of optical path change is different for different channels (i.e., the wavelength spread between peak 58a and peak 64a is less than the wavelength spread between peak 58b and peak 64b), which leads to different dispersion characteristics for different channels.

Gratings with designs of this type may be used to compensate for dispersion slope in addition to compensating for dispersion. In general, dispersion compensating elements or modules may be generated that have a range of dispersion compensation and dispersion slope compensation characteristics. An optical network maintainer may select appropriate dispersion compensation devices or modules to use in a communications link as desired. The devices or modules may be installed during the manufacturing process or may be installed in amplifiers or in other equipment at network nodes in the field.

If desired, multiple separate superstructure grating sections, which each compensate for different channels, may be spliced together in series, and used in place of a single grating. The channels which are compensated by each grating section can be selected somewhat arbitrarily, but should generally be equally spaced. As an example, one grating section may be used to compensate for dispersion on channel numbers 1, 2, 3, . . . 20, while another grating section may be used to compensate for dispersion on channel numbers 21, 22, . . . 40. As another example, one section may compensate for dispersion on even channels, whereas another section may compensate for dispersion on odd channels.

Figure 9:
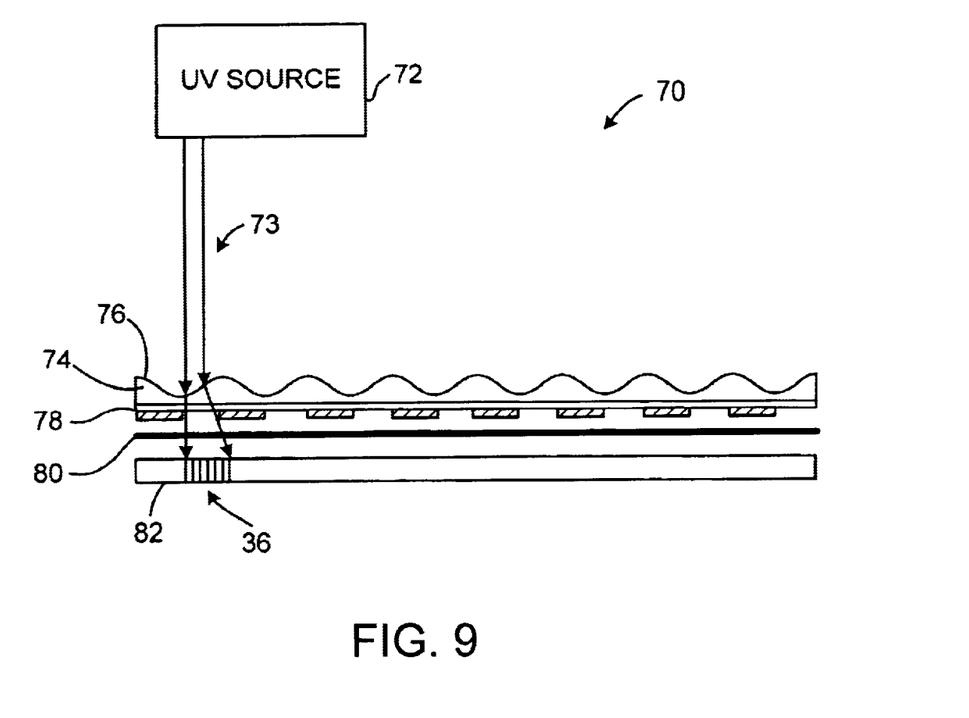
FIG. 9 as a schematic diagram of an illustrative arrangement for forming the superstructure grating in accordance with the present invention.

An illustrative arrangement for fabricating gratings such as grating 20 is shown in FIG. 9. System 70 may have a ultraviolet (UV) source 72 for producing a light beam 73. In the example of FIG. 9, beam 73 has a cross-section of about the same size as a single grating sample 36 (shown schematically by the vertical lines on fiber 82). With this type of arrangement, beam 73 and the assembly made up of fiber 82 and the mask elements adjacent to the fiber may be moved relative to each other in a step-and-repeat fashion, so that each sample 36 may be created or written. Another suitable approach involves using a larger UV beam and writing multiple grating samples simultaneously.

UV source 72 may be an excimer laser or other suitable source for producing UV light. The UV light produced by source 72 may have a wavelength of 248 nm or other suitable wavelength.

Fiber 82 may be any suitable photosensitive optical fiber for use in fiber-optic networks, such as deuterium-loaded fiber.

Light beam 73 may be spread laterally (parallel to the length of fiber 82) using a glass plate 74 with a series of curved ribs 76. An amplitude mask such as mask 78 may be used to block light from fiber 82 in regions between grating samples 36.

A phase mask 80 may be used to impress the fine grating patterns (e.g., the 0.5 $\mu$m grating periods) onto fiber 82. The grating period of the gratings on mask 80 may be chirped along the length (e.g., the approximately 10 cm length) of mask 80 parallel to fiber 82, as shown in FIG. 4. Because of the beam divergence created by the curved surface of plate 74, the grating periods that are written onto fiber 82 within each grating sample 36 are chirped, as shown by FIG. 5.

Figure 10:
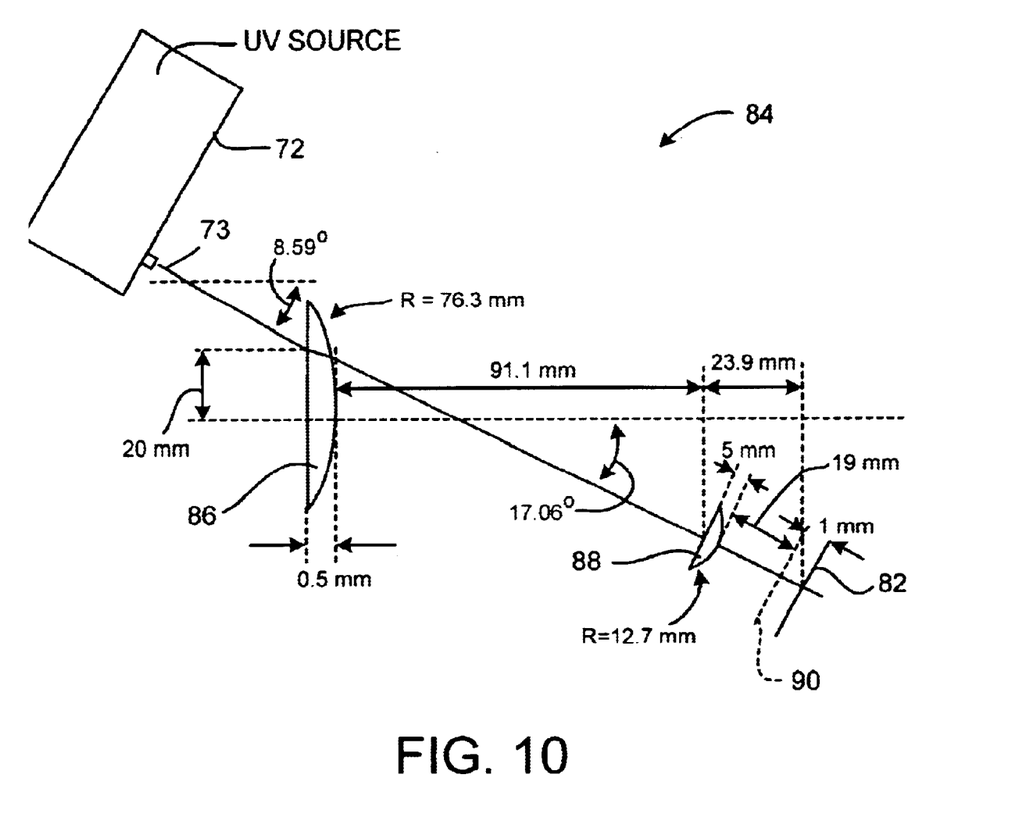
FIG. 10 is a schematic diagram of another illustrative arrangement for forming the superstructure grating in accordance with the present invention.

Another suitable arrangement for creating chirped fiber superstructure gratings is shown in FIG. 10. In system 84, lenses 86 and 88 may be used to direct light beam 73 onto fiber 82. Lenses 86 and 88 may be $CaF_2$ lenses, mirrors, or any other suitable optical components suitable of optically modifying beam 73. FIG. 10 is annotated with illustrative component characteristics such as radii of curvature and inter-component angles and distances. This is merely one illustrative system configuration. Any suitable configuration may be used if desired.

With the arrangement of FIG. 10, lens 86 may create cylindrical lens aberrations for beam 73. These aberrations may be used to create chirp. Optional lens 88 may be placed at the focus of lens 86 to help focus and direct beam 73 through mask 90 onto fiber 82. Lens 88 may make the chirp created by the lens aberrations of lens 86 more linear. Mask 90 may be used to create the approximately 0.5 μm gratings onto fiber 82. The grating period across mask 90 may be chirped as shown in FIG. 4. Lenses 86 and 88 may create the chirp of FIG. 5.

To cover the entire length of grating 20, the optics of system 84 and the fiber 82 and associated masks may be stepped relative to each other (e.g., in 1 mm steps that are comparable to the length of a single grating sample 36 or any other suitable step size). Mask 90 may include an optional amplitude mask or amplitude masking functions may be performed by limiting the size of beam 73.

The arrangements of FIGS. 9 and 10 are merely illustrative. Any suitable approach may be used to create grating 20 if desired. For example, a mask may be used that incorporates a grating pattern that is chirped both across the entire mask (like FIG. 4) and that is chirped within each grating sample region (like FIG. 5). The masks that are used may include the amplitude information necessary to produce grating apodization.

It will be understood that the foregoing is merely illustrative of the principles of this invention, and that various modifications can be made by those skilled in the art without departing from the scope and spirit of the invention.

What is claimed is:

1. A dispersion compensation element for compensating for dispersion in optical data signals in a signal band on a wavelength-division-multiplexing fiber-optic communications system, comprising:
    a chirped superstructure fiber grating on a fiber, wherein the chirped superstructure fiber grating has a plurality of grating samples spaced apart along a given length of the fiber, wherein each grating sample has a plurality of grating periods, wherein the grating periods are chirped due to a first chirp contribution and a second chirp contribution, wherein the first chirp contribution gives rise to a chirp that varies from one amount of chirp to another amount of chirp along the given length of fiber, and wherein the second chirp contribution varies from a first amount of chirp to a second amount of chirp across each of the grating samples.

2. The dispersion compensation element defined in claim 1 wherein the grating samples are spaced apart along the length of the fiber so that the dispersion compensation element produces a given dispersion slope for the optical data signal in the signal band.

3. The dispersion compensation element defined in claim 1 wherein the first chirp contribution is about 1 nm across the given length.

4. The dispersion compensation element defined in claim 1 wherein the second chirp contribution is about 40 nm across each grating sample.

5. A dispersion compensation module comprising:
    a fiber input;
    a fiber output; and
    a chirped superstructure fiber grating on a fiber that is optically coupled between the fiber input and the fiber output, wherein the chirped superstructure fiber grating has a plurality of grating samples spaced apart along a given length of the fiber, wherein each grating sample has a plurality of grating periods, wherein the grating periods are chirped due to a first chirp contribution and a second chirp contribution, wherein the first chirp contribution gives rise to a chirp that varies from one amount of chirp to another amount of chirp along the given length of fiber, and wherein the second chirp contribution varies from a first amount of chirp to a second amount of chirp across each of the grating samples.

6. The dispersion compensation module defined in claim 5 wherein the grating samples are spaced from one another so that the fiber grating produces a produce a given dispersion slope.

7. The dispersion compensation module defined in claim 5 wherein the first chirp contribution is about 1 nm across the given length.

8. The dispersion compensation module defined in claim 5 wherein the second chirp contribution is about 40 nm across each grating sample.

9. An optical amplifier used to amplify optical data signals in a signal band that are provided to the optical amplifier from a fiber-optic communications link, comprising:
    an input fiber that receives the optical data signals from the fiber-optic communications link;
    an output fiber at which corresponding amplified optical data signals are provided;
    a first gain stage that amplifies the optical data signals;
    a second gain stage that amplifies the optical data signals;
    a dispersion compensation element between the first and second gain stages that compensates for dispersion of the optical data signals in the signal band, wherein the dispersion compensation element comprises a chirped superstructure fiber grating on a fiber, wherein the chirped superstructure fiber grating has a plurality of grating samples spaced apart along a given length of the fiber, wherein each grating sample has a plurality of grating periods, wherein the grating periods are chirped due to a first chirp contribution and a second chirp contribution, wherein the first chirp contribution gives rise to a chirp that varies from one amount of chirp to another amount of chirp along the given length of fiber, and wherein the second chirp contribution varies from a first amount of chirp to a second amount of chirp across each of the grating samples.

10. The optical amplifier defined in claim 9 wherein the grating samples are spaced to produce a given dispersion slope for the optical data signals in the signal band.

11. The optical amplifier t defined in claim 9 wherein the first chirp contribution is about 1 nm across the given length.

12. The optical amplifier defined in claim 9 wherein the second chirp contribution is about 40 nm across each grating sample.

13. A method comprising:
    providing a ultraviolet light beam;
    using a cylindrical lens to produce cylindrical lens aberrations in the light beam; and
    directing the light beam after the cylindrical lens onto a length of fiber to produce a chirped superstructure fiber grating that has a plurality of grating samples spaced apart along a given length of the fiber, wherein each grating sample has a plurality of grating periods, wherein the grating periods are chirped due to a first chirp contribution and a second chirp contribution, wherein the first chirp contribution gives rise to a chirp that varies from one amount of chirp to another amount of chirp along the given length of fiber, and wherein the second chirp contribution varies from a first amount of chirp to a second amount of chirp across each of the grating samples.

14. The method defined in claim 13 wherein directing the light beam comprises moving the light beam relative to the fiber in a step and repeat fashion.

15. The method defined in claim 14 wherein directing the light beam comprises using a phase mask to create the first chip contribution.

* * * * *